Figure 1:
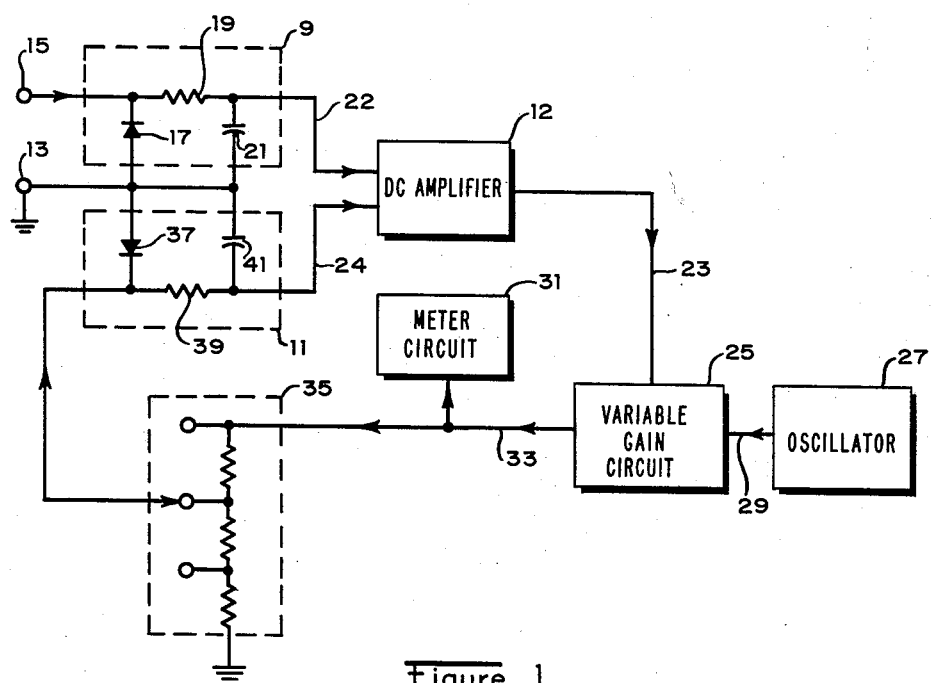

July 28, 1964  N. N. KOVALEVSKI  3,142,799

HIGH FREQUENCY VOLTMETER UTILIZING SELF-BALANCING LOOP

Filed Sept. 21, 1960

INVENTOR
NICHOLAS N. KOVALEVSKI
BY
ATTORNEY

United States Patent Office 3,142,799
Patented July 28, 1964

3,142,799
HIGH FREQUENCY VOLTMETER UTILIZING SELF-BALANCING LOOP
Nicholas N. Kovalevski, Palo Alto, Calif., assignor to Hewlett-Packard Company, Palo Alto, Calif., a corporation of California
Filed Sept. 21, 1960, Ser. No. 57,515
5 Claims. (Cl. 324—99)

This invention relates to high frequency voltmeters and more particularly to a circuit for linearizing the relationship between the applied voltage and the resulting meter indication over the entire operating range of voltages.

Voltmeter circuits for measuring voltages at very high frequencies of the order of 1 kilo megacycle usually comprise means to develop a direct current voltage that is proportional to the amplitude of the wave form being measured. This type of operation uses relatively simple circuitry to produce an indication of the magnitude of the voltage under examination. The means to develop a direct current voltage which is proportional to the amplitude of the waveform under examination is usually contained within a probe. Thus the signal fed from the probe to the main portion of the instrument is an easily handled D.-C. signal instead of a high frequency signal.

High frequency voltmeter probes have been developed using thermionic diodes in a rectifying circuit contained within the body of the probe. The use of thermionic diodes, such as vacuum tube diodes, has many disadvantages. It is known that a vacuum tube diode develops a thermionic potential when no voltage is applied to its plate, this potential being dependent upon the temperature of the cathode. In order to obtain accurate information in the form of a D.-C. voltage that is proportional to the amplitude of the waveform under examination, it is necessary to compensate for the thermionic potential that appears as an increment of D.-C. voltage at the output of the rectifier circuit. It is possible to regulate the power supplied to the filament of the vacuum tube diode in order to maintain the temperature of the filament at a substantially constant value and by using a relatively stable bucking voltage, it is possible to compensate for the mean value of thermionic potential which is generated. However, changes in ambient temperature, aging of the tube, and other factors have been found to produce drift of the order of two millivolts in the thermionic potential. It is therefore difficult to make accurate low level measurements of high frequency voltages using a thermionic diode.

A disadvantage encountered in making high frequency voltage measurements using a diode probe is that the rectification (i.e., the conversion of the applied A.-C. signal to a related D.-C. voltage) varies non-linearly with applied signal level. For this reason it is frequently necessary to provide an indicating meter with a non-linear scale that compensates for the rectification characteristic of the diode. A non-linear meter scale is generally calibrated for a particular diode and has more closely spaced graduation at one end of the scale. The accuracy of the meter is reduced, then, when the diode is replaced. In addition, it is difficult to obtain a reading on the portion of the scale that is compressed.

It is therefore an object of the present invention to provide a voltmeter circuit which is capable of obtaining accurate measurements of low level, high frequency voltages.

It is another object of the present invention to provide a voltmeter circuit which provides a linear relationship between the applied voltage and the resulting meter indication over the entire operating range of voltages.

It is still another object of the present invention to provide a voltmeter circuit which is relatively insensitive to variations in ambient temperature.

Figure 2:
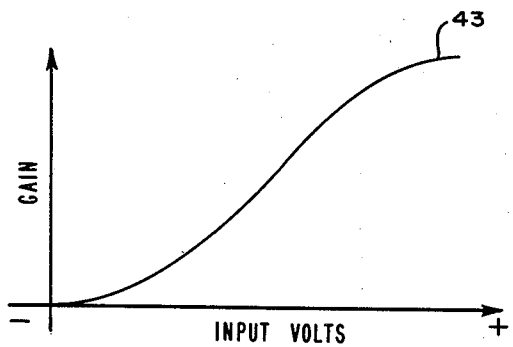

Other and incidental objects of the present invention will be apparent from a reading of this specification and an inspection of the accompanying drawing in which:

FIGURE 1 is a schematic diagram of a voltmeter circuit in accordance with the present invention, and FIGURE 2 is a graph showing a typical transmission characteristic for the variable gain circuit of FIGURE 1.

Referring now to FIGURE 1 of the drawing, a probe circuit comprising transducers 9 and 11 is shown connected to D.-C. amplifier 12. Input terminals 13 and 15 are provided to connect the circuit under examination to the probe circuit. Terminal 15 is connected to shunt rectifying diode 17 and resistor 19 of transducer 9. The other terminal of resistor 19 is connected to capacitor 21 and to one input terminal 22 of D.-C. amplifier 12. The output of D.-C. amplifier 12 is connected to one input terminal 23 of variable gain circuit 25. Oscillator 27 is connected to the other input terminal 29 of variable gain circuit 25. Metering circuit 31 is connected to the output terminal 33 of variable gain circuit 25. A feedback path including variable attenuator 35 is provided between the output terminal 33 of variable gain circuit 25, and one terminal of rectifying diode 37 of transducer 11. Serially connected resistor 39 and capacitor 41 are connected between the same one terminal of rectifying diode 39 and grounded terminal 13. The common terminal of resistor 39 and capacitor 41 is connected to the other input terminal 24 of D.-C. amplifier 12.

Referring now to the graph of FIGURE 2, a typical curve of transmission or gain from terminal 29 to terminal 33 of variable gain circuit 25 of FIGURE 1 as a function of the D.-C. voltage applied to terminal 23 is shown as curve 43. The transmission characteristic curve 43 passes through the original and increases continuously with increasing input voltage over the range of operating values. Curve 43 represents a value of zero gain for values of input voltage that are negative or zero. This is necessary to maintain stable operation of the feedback circuit of FIGURE 1 for all values of voltage applied to terminal 23. One device for realizing the characteristic curve 43 of variable gain circuit 25 is an amplifier stage comprising a tube having a plurality of control grids. The signal to be amplified is applied to terminal 29, which is one control grid and the D.-C. input voltage at terminal 23 serves to overcome a bias voltage applied to another control grid. The gain characteristic of such an amplifier is monotonically controlled by the input voltage over the range of operating values.

Other devices may be used as the variable gain circuit 25. For example, passive networks with crystal diodes, thermistors, or other variable resistors may be used. The input voltage, when properly introduced, may be used to control the conductivity of the above mentioned devices and affect the transmission through the network. A magnetic amplifier circuit operating with bias saturation may also be used. A control current proportional to the voltage at terminal 23, serving to cancel the saturating bias for positive input voltages and serving to maintain the saturating bias for zero and negative input voltages, would provide the desired transmission characteristic through the circuit.

In operation, input terminals 13 and 15 of the voltmeter probe are connected to the circuit under examination. The high freqency voltage appearing on terminal 15 with respect to ground terminal 13 is applied to the rectifying diode 17 of transducer 9. The D.-C. voltage that is produced is filtered by the combination of resistor 19 and capacitor 21, and is applied to the input terminal 22 of the D.-C. amplifier 12. At low levels of applied high frequency signal, diode 17 operates in the region of substantially linear relationship between the applied A.-C. signal and the resulting D.-C. voltage. Thus the voltage that appears at input terminal 23 of amplifier 12 is non-linearly related to the amplitude of the signal applied to input terminal 15.

The present circuit is not restricted to the use of diode rectifiers only. For special purposes, such as when a true R.M.S. (root mean square) indicating meter is required, a D.-C. voltage may be obtained which is related to the electrostatic force exerted upon the plates of a condensor by the applied A.-C. signal. For this reason, the term transducer is used to described the device which provides a D.-C. voltage that is related to the applied signal.

The feedback voltage that is applied to diode 37 is converted to a D.-C. voltage which is filtered by the combination of resistor 39 and capacitor 41. The D.-C. voltage is applied to input terminal 24 of D.-C. amplifier 12. Thus the voltage that appears at input terminal 24 of D.-C. amplifier 12 is non-linearly related to the amplitude of the applied feedback signal. Since diodes 17 and 37 are located in the probe and are operating at substantially the same ambient temperature, thermally generated voltages in the two diodes are added in substantially equal increments to the voltages that appear at input terminals 22 and 24.

Direct current amplifier 12 is a differential amplifier which produces an output voltage that is proportional to the difference between the voltages appearing at its input terminals. A single-ended amplifier may be used in place of the differential amplifier 12 by connecting large resistors of substantially the same value between the single input terminal of such an amplifier and each of terminals 22 and 24. Both schemes yield an amplifier output signal that is proportional to the difference between the applied voltages. Thus, the thermally generated voltages in diodes 17 and 37 tend to cancel and not affect the amplitude of the signal at the output of the amplifier.

The difference between the voltages appearing at terminals 22 and 24 is amplified by the high gain, D.-C. amplifier 12, and appears as a D.-C. voltage at terminal 23 of the variable gain circuit 25. A voltage controlled gain amplifier at 25 operating on the substantially constant frequency output of oscillator 27, produces a constant frequency signal at terminal 33, having an amplitude that is non-linearly related to the voltage appearing at terminal 23. The metering circuit 31 is provided to produce a visual indication of the amplitude of the signal produced by the variable gain circuit 25. The aforementioned feedback signal is derived from the output terminal 33, and is transmitted through the variable attenuator or range switch 35 to rectifying diode 37.

For high gain around the feedback loop, the difference in the voltages appearing at amplifier terminals 22 and 24 is very small, thus establishing the relationship that the two terminal voltages are substantially equal, regardless of non-linearities in the circuit. The voltage at terminal 33 is applied to a current indicating meter in the meter circuit 31 through a large resistor and a meter rectifier, and is also applied to attenuator 35. The voltage at terminal 33 is sufficiently high to operate the meter rectifier in the region of linear relationship between the peak A.-C. input voltage and the resulting D.-C. output voltage over substantially the entire meter range. Thus, the large rectified voltage and large resistor constitute a current source having a magnitude that is linearly related to the voltage at terminal 33 and which is indicated by the meter of meter circuit 31. Attenuator 35, then, is required to apply a proportional amount of the large signal voltage that appears at terminal 33 to the feedback diode 37, and thus constitutes an input voltage range selector.

It can be seen from the above description that the meter circuit 31 at the output of the high gain feedback circuit will produce a visual indication that is substantially linearly related to the amplitude of the high frequency voltage applied to terminal 15, despite the non-linear circuit elements. The D.-C. voltage that is produced from the measured input signal, according to the non-linear characteristics of diode 17, is substantially equal to the D.-C. voltage that is produced from a proportional amount of the signal appearing at terminal 33 according to the non-linear characteristics of diode 37. And if the non-linear characteristics of diodes 17 and 37 are identical, then the voltage appearing at terminal 33 must be linearly related to the measured input voltage over the entire operating range of voltages. It can also be seen that the circuit is relatively insensitive to temperature variations, especially when operating at low levels, since both diodes operate at the same ambient temperature and produce substantially equal thermal voltages which tend to be cancelled out by the differential amplification. In addition, since both diodes operate at the same ambient temperature, their rectification characteristics tend to change similarly with changes in temperature.

I claim:

1. High frequency signal apparatus comprising a first transducer to produce a first D.-C. voltage related to the amplitude of an applied signal, circuit means to produce an alternating output signal having an amplitude that is related to a voltage applied thereto, indicating means, means to apply said alternating output signal to said indicating means to produce an indication of the amplitude of said alternating output signal, a second transducer connected to receive said alternating output signal for producing a second D.-C. voltage that is related to the amplitude of said alternating output signal, means to produce an error signal related to the combination of said first and second D.-C. voltages, and means connected to said circuit means for applying said error signal thereto.

2. A voltmeter circuit for measuring high frequency electrical signal, said circuit comprising a first transducer to produce a first D.-C. voltage related to the amplitude of said signal, circuit means to produce an alternating output signal having an amplitude that is related to a voltage applied thereto, indicating means, means to apply said output signal to said indicating means to produce an indication of the amplitude of said output signal, a second transducer connected to receive said alternating output signal for producing a second D.-C. voltage that is related to the amplitude of said output signal, said first and second transducers having similar signal to D.-C. voltage conversion characteristics, means to produce an error signal related to the difference between said first and second D.-C. voltages, and means connected to said circuit means for applying thereto a voltage, related to said error signal.

3. A voltmeter circuit for measuring high frequency electrical signals, said circuit comprising a first rectifying circuit to produce a first D.-C. voltage related to the amplitude of said signal, circuit means having input and output terminals, said circuit means producing an alternating output signal having an amplitude that is related to a voltage applied to said input terminal thereof, indicating means, means connecting said output terminal to said indicating means for applying said output signal thereto, said indicating means providing an indication of the amplitude of said output signal, a second rectifying circuit connected to receive said alternating output signal for producing a second D.-C. voltage related to the amplitude of said output signal, said first and second rectifying circuits having similar signal to D.-C. voltage conversion characteristics, means connected to said first and second rectifying circuits for producing an error signal related to the difference between said first and second D.-C. voltages, and an amplifier connected to the input terminal of said circuit means for applying thereto a voltage that is proportional to said error signal.

4. A voltmeter circuit for measuring high frequency electrical signals, said circuit comprising a first rectifying circuit to produce a first D.-C. voltage related to the amplitude of said signal, circuit means having input and output terminals, said circuit means producing an alternating output signal having an amplitude that is related to the voltage applied to said input terminal thereof, indicating means, means connecting said output terminal to said indicating means for applying said output signal thereto, said indicating means providing an indication that is proportional to the amplitude of said output signal, a second rectifying circuit connected to receive said alternating output signal for producing a second D.-C. voltage that is related to the amplitude of said output signal, said first and second rectifying circuits being physically disposed in similar environments to operate at substantially equal ambient temperatures for providing similar signal to D.-C. voltage conversion characteristics independent of temperature, means connected to said first and second rectifying circuits for producing an error signal that is proportional to the difference between said first and second D.-C. voltages, and a direct current amplifier connected to the input terminal of said circuit means for applying thereto a voltage that is proportional to said error signal.

5. A voltmeter circuit for measuring high frequency electrical signal, said circuit comprising a first rectifying circuit including a first diode and filtering means to produce a first D.-C. voltage that is related to the amplitude of said signal, an oscillator to produce an alternating signal, a variable gain circuit connected to receive said alternating signal and produce an output signal having an amplitude that is related to a control voltage applied thereto, a metering circuit connected to receive said output signal for producing an indication of the amplitude of said output signal applied thereto, an attenuator, a second rectifying circuit including a second diode and filtering means, means including said atteunator and connecting the output of said variable gain circuit to said second rectifying circuit, said second rectifying circuit producing a second D.-C. voltage that is related to the amplitude of the portion of the output signal applied thereto through said attenuator, said first and second diodes having similar signal to D.-C. voltage conversion characteristics and being physically disposed in similar environments to operate at substantially equal ambient temperatures, and a direct current amplifier connected to said variable gain circuit for applying thereto a control voltage that is proportional to the difference between said first and second D.-C. voltages.

References Cited in the file of this patent

UNITED STATES PATENTS

| | | |
|---|---|---|
| 2,398,606 | Wang | Apr. 16, 1946 |
| 2,399,481 | George | Apr. 30, 1946 |
| 2,918,619 | Darling | Dec. 22, 1959 |